(12) United States Patent
Zhan et al.

(10) Patent No.: US 11,244,140 B2
(45) Date of Patent: Feb. 8, 2022

(54) ELECTRONIC APPARATUS AND TEXTURE RECOGNITION DEVICE

(71) Applicants: Beijing BOE Sensor Technology Co., Ltd., Beijing (CN); BOE TECHNOLOGY GROUP CO., LTD., Beijing (CN)

(72) Inventors: Xiaozhou Zhan, Beijing (CN); Cheng Li, Beijing (CN); Yanna Xue, Beijing (CN); Yajie Feng, Beijing (CN); Kuiyuan Wang, Beijing (CN); Yue Geng, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/905,997

(22) Filed: Jun. 19, 2020

(65) Prior Publication Data
US 2021/0027036 A1    Jan. 28, 2021

(30) Foreign Application Priority Data
Jul. 25, 2019   (CN) .......................... 201910677288.9

(51) Int. Cl.
*G06K 9/00*    (2006.01)

(52) U.S. Cl.
CPC .................................. *G06K 9/0004* (2013.01)

(58) Field of Classification Search
None
See application file for complete search history.

(56) References Cited

U.S. PATENT DOCUMENTS

2018/0300525 A1*  10/2018  Fourre ............... G06K 9/00093
2019/0006440 A1*   1/2019  Sun ...................... H01L 27/3248
(Continued)

FOREIGN PATENT DOCUMENTS

| CN | 101630213 A | 1/2010 |
|---|---|---|
| CN | 205910951 U | 1/2017 |

(Continued)

OTHER PUBLICATIONS

First Office Action for CN Patent Application No. 201910677288.9 dated Jan. 6, 2021.

*Primary Examiner* — Benjamin X Casarez
(74) *Attorney, Agent, or Firm* — Thomas | Horstemeyer, LLP

(57) ABSTRACT

An electronic apparatus and a texture recognition device are described that relate to image recognition technologies. The texture recognition device includes a sensing layer, a transparent contact layer, a light shielding layer, and a plurality of light sources. The sensing layer includes a plurality of photosensitive units distributed in an array; the transparent contact layer is disposed on a side of the sensing layer; the light shielding layer is disposed between the sensing layer and the transparent contact layer, and including a plurality of light transmission portions arranged in an array; and the light sources are distributed in an array on a side of the light shielding layer close to the transparent contact layer, and light emitted by the light sources is reflected by the transparent contact layer and transmitted to the photosensitive units by passing through the light transmission portions.

16 Claims, 3 Drawing Sheets

(56) References Cited

U.S. PATENT DOCUMENTS

| | | | | |
|---|---|---|---|---|
| 2019/0049631 A1* | 2/2019 | Lin | ........................ | G02B 5/005 |
| 2019/0080138 A1* | 3/2019 | Gao | ..................... | G02B 3/0031 |
| 2019/0311176 A1* | 10/2019 | Haddad | .............. | G06K 9/00046 |
| 2019/0354789 A1* | 11/2019 | Gu | ....................... | G06K 9/00087 |
| 2020/0127066 A1* | 4/2020 | Zhang | ................. | H01L 51/5275 |
| 2020/0320267 A1* | 10/2020 | Zhang | .................. | G06K 9/0004 |
| 2020/0401781 A1* | 12/2020 | Haddad | ................ | G06K 9/0008 |

FOREIGN PATENT DOCUMENTS

| | | | | | |
|---|---|---|---|---|---|
| CN | 107103307 A | * | 8/2017 | ......... | H01L 51/5262 |
| JP | 2008016318 A | | 1/2008 | | |

* cited by examiner

ELECTRONIC APPARATUS AND TEXTURE RECOGNITION DEVICE

CROSS-REFERENCE TO RELATED APPLICATIONS

The present application claims the benefit of and priority to Chinese Patent Application No. 201910677288.9, filed on Jul. 25, 2019, the contents of which being incorporated by reference in their entirety herein.

TECHNICAL FIELD

The present disclosure relates to the field of image recognition technologies and, in particular, to an electronic apparatus and a texture recognition device.

BACKGROUND

Texture recognition technologies, such as fingerprint recognition and palmprint recognition, have been widely used in various devices such as mobile phones and computers for identification to improve security of these devices. To achieve texture recognition, optical, capacitive, and ultrasonic imaging technologies and the like may be adopted, and the optical texture recognition technology is more commonly used.

At present, in optical texture recognition technology, a light source is generally adopted to illuminate textures such as fingerprints and palmprints. Light reflected from the textures is used to form an image and the image is processed to obtain texture information. However, in addition to the light source and photoelectric sensors, in order to obtain the image of the texture, an optical path system including lens or the like is also needed to control the optical path. The device is thick due to the optical path system, and the cost is high.

It should be noted that the contents disclosed in the Background section above are only for enhancing understanding of the background of the present disclosure and thus, may include contents that do not constitute prior art known to those of ordinary skill in the art.

SUMMARY

To solve the above-mentioned problems in the prior art, the present disclosure provides an electronic apparatus and a texture recognition device so as to decrease thickness and reduce cost.

An aspect of the present disclosure provides a texture recognition device, including:

a sensing layer including a plurality of photosensitive units distributed in an array;

a transparent contact layer disposed on a side of the sensing layer;

a light shielding layer disposed between the sensing layer and the transparent contact layer, and including a plurality of light transmission portions arranged in an array; and a plurality of light sources distributed in an array on a side of the light shielding layer close to the transparent contact layer, and light emitted by the light sources is reflected by the transparent contact layer and transmitted to the photosensitive units by passing through the light transmission portions.

In an exemplary embodiment of the present disclosure, the light sources include a Mini light-emitting diode (LED) and a Micro LED.

In an exemplary embodiment of the present disclosure, ranges on a surface of the transparent contact layer facing away from the sensing layer, where two adjacent light transmission portions obtain light rays at least partially overlap with each other; and ranges on the sensing layer, irradiated by light transmitted by two adjacent light transmission portions, are spaced from each other.

In an exemplary embodiment of the present disclosure, each of the light transmission portions includes a through hole penetrating the light shielding layer.

In an exemplary embodiment of the present disclosure, a center distance between two adjacent light transmission portions satisfies the following conditions:

$$\sqrt{2}\, h_o \frac{d_h}{h_h} \geq r \geq 2 h_i \frac{d_h}{h_h}$$

where r is the center distance between two adjacent light transmission portions, and $h_o$ is a distance between a center of the light transmission portion and a surface of the transparent contact layer facing away from the sensing layer in a direction perpendicular to the light shielding layer, $h_i$ is a distance between the center of the light transmission portion and a surface of the sensing layer close to the light shielding layer in the direction perpendicular to the light shielding layer, $d_h$ is a diameter of the light transmission portion, $h_h$ is a length of the light transmission portion in the direction perpendicular to the light shielding layer.

In an exemplary embodiment of the present disclosure, the light shielding layer includes:

a light transmission layer;

a light-proof material layer stacked on a surface of the light transmission layer close to the sensing layer, and provided with a plurality of through holes;

a plurality of transparent fillers filled in the through holes in a one-to-one correspondence, and a refractive index of the transparent filler is smaller than a refractive index of the light transmission layer; and the light transmission portions include the transparent fillers, and portions of the light transmission layer covered by the transparent fillers.

In an exemplary embodiment of the present disclosure, the light shielding layer includes:

a light transmission layer;

a light-proof material layer stacked on a surface of the light transmission layer facing away from the sensing layer, and provided with a plurality of through holes;

a plurality of transparent fillers filled in the through holes in a one-to-one correspondence, and a refractive index of the transparent filler is greater than a refractive index of the light transmission layer; and the light transmission portions include the transparent fillers, and portions of the light transmission layer covered by the transparent fillers.

In an exemplary embodiment of the present disclosure, a center distance between two adjacent light transmission portions satisfies the following conditions:

$$\frac{\sqrt{6}\, n_1 h_2}{4 n_2} \geq r \geq \frac{\sqrt{3}}{2} h_1$$

where r is the center distance between two adjacent light transmission portions, and $h_1$ is a distance between a center of the light transmission portion and a surface of the transparent contact layer facing away from the sensing layer in a direction perpendicular to the light shielding layer, $h_2$ is a distance between the center of the light transmission portion and a surface of the sensing layer close to the light shielding layer in the direction perpendicular to the light shielding layer, $n_1$ is a larger one in the refractive indexes of the transparent filler and the light transmission layer, $n_2$ is a smaller one in the refractive indexes of the transparent filler and the light transmission layer.

In an exemplary embodiment of the present disclosure, the texture recognition device further includes:

a transparent flat layer, covering the light sources and the light shielding layer, and the transparent contact layer is located on a side of the transparent flat layer facing away from the light shielding layer.

According to an aspect of the present disclosure, there is provided an electronic apparatus including the texture recognition device described in any one of the above.

When the electronic apparatus and the texture recognition device of the present disclosure are used, the finger, the palm, or other object to be tested is attached to the surface of the transparent contact layer facing away from the sensing layer. After the light emitted by the light source is reflected by the texture, the light may pass through the light transmission portions and directly irradiate the photographic units of the sensing layer, then the photographic units may perform a photoelectric conversion to obtain information about the texture. In this process, a special optical path system is avoided, so that the structure of the texture identification device is simplified, thereby decreasing the thickness of the electronic apparatus and reducing costs.

It should be noted that the above general description and the following detailed description are merely exemplary and explanatory and should not be construed as limitation of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Figure 1:
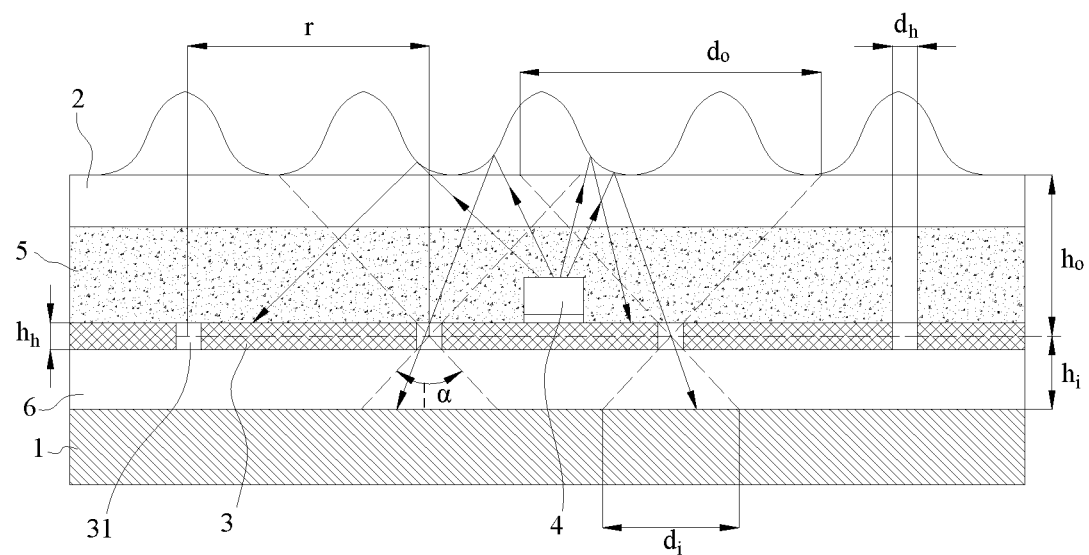
FIG. 1 is a partial cross-sectional view of a texture recognition device according to a first embodiment of the present disclosure.

Hereinafter, illustrative embodiments will be described more fully with reference to the drawings. However, the illustrative embodiments can be implemented in various forms and should not be construed as being limited to the embodiments set forth herein; on the contrary, the present disclosure will be comprehensive and complete by providing these embodiments, so that those skilled in the art learn the idea of the embodiments. The same reference numerals in the drawings denote the same or similar structures, and thus their detailed description will be omitted. Further, the drawings are schematic and are not necessarily drawn to scale.

Although relative terms such as "above" and "below" are used in the specification to describe a relative relationship of one component to another component shown, these terms are only used for convenience in this specification. For example, these terms are defined according to an exemplary direction shown in the drawings. It will be understood that if the device shown is flipped upside down, the relative relationship of the component should be changed. When a structure is formed "on" another structure, it may mean that the structure is formed on another structure integrally, or mean that the structure is "directly" disposed on another structure, or mean that the structure is "indirectly" disposed on another structure through other structures.

The terms "one," "a," "the," "said," and "at least one" are used to indicate that there are one or more elements, components, or the like. The terms "include" and "have" are used to indicate an open type meaning of including and means that there may be additional elements, components, etc. in addition to the listed elements, components, etc. The terms "first," "second," "third," etc. are used only as markers, and do not limit the number of objects.

An embodiment of the present disclosure provides a texture recognition device used for recognizing an object having textures to be tested. The textures include convex ridges and concave valleys. For example, the textures may be fingerprints, palm prints or the like, which is not listed here. As shown in FIGS. 1, 2, 4, and 5, the texture recognition device includes a sensing layer 1, a transparent contact layer 2, a light shielding layer 3, and a light source 4.

The sensing layer 1 includes a plurality of photosensitive units distributed in an array. The transparent contact layer 2 is disposed on a side of the sensing layer 1. For example, a surface of the transparent contact layer 2 facing away from the sensing layer 1 is a contact surface to be pressed by a finger. The light shielding layer 3 is disposed between the sensing layer 1 and the transparent contact layer 2, and includes a plurality of light transmission portions 31 arranged in an array. The texture recognition device has multiple light sources 4, and the light sources 4 are distributed in an array on a side of the light shielding layer 3 close to the transparent contact layer 2. Light emitted by the light sources is reflected by the transparent contact layer, passes through the light transmission portions, and reaches the photosensitive units.

When the texture recognition device of the embodiment of the present disclosure is used, a finger, a palm, or other object to be tested may be attached to the surface of the transparent contact layer 2 facing away from the sensing layer. Light rays emitted by the light source 4 are reflected by the texture, and then pass through the light transmission portions 31 to directly irradiate the photographic units of the sensing layer 1. According to a principle of pin-hole imaging, a pattern corresponding to the ridge and the valley can be formed on the sensing layer 1. The photographic unit can perform a photoelectric conversion to obtain texture information of the object to be tested. Through this process, an optical path system dedicated for controlling the optical path is avoided, thus the structure of the texture identification device is simplified, which is beneficial to decreasing the thickness of the electronic device and reducing costs.

The following is a detailed description of each part of the texture recognition device according to the embodiment of the present disclosure.

Figure 2:
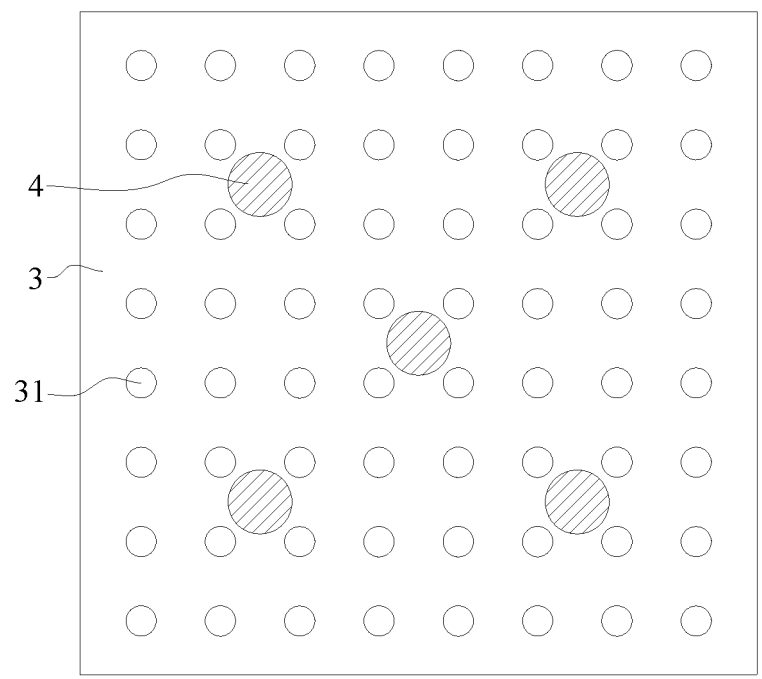
FIG. 2 is a partial top view of a texture recognition device according to a first embodiment of the present disclosure.

As shown in FIGS. 1 and 2, the sensing layer 1 may be provided on a substrate used to support the sensing layer 1, thus the manufacturing is simplified. The substrate is not necessary, and may not be provided. Further, the sensing layer 1 includes a plurality of photosensitive units distributed in an array, and the number of the photosensitive units is not specifically limited herein. For example, in the sensing layer 1, every 70 μm range may be provided with 2-4 photosensitive units.

Each photosensitive unit is configured to perform the photoelectric conversion after receiving the light rays reflected by the texture, and output an electrical signal containing the texture information. Therefore, the recognition can be performed by comparing the texture information with standard information. Specifically, the texture is uneven between the ridge and valley, and the ridge and valley have different reflection effects, thus alternative bright and dark stripes are formed on the sensing layer 1. The bright stripe corresponds to the ridge, and the dark stripe corresponds to the valley. The photosensitive units can sense the bright stripes and the dark stripes to generate corresponding electrical signals, thereby obtaining the texture information. The photosensitive unit may be an image recognition sensor or other sensing devices with the same function, which is not specifically limited herein. In addition, the above-mentioned texture information may also be used to display the texture image through a display device.

As shown in FIGS. 1 and 2, the transparent contact layer 2 is provided on a side of the sensing layer 1, and a space capable of accommodating the light shielding layer 3 and the light source 4 can be provided between the transparent contact layer 2 and the sensing layer 1. Further, the surface of the transparent contact layer 2 facing away from the sensing layer 1 is contact with the textures of the object to be tested. For convenience of description, the surface is hereinafter referred to as a contact surface. When the texture recognition is performed, the textures of the object to be tested are attached to the contact surface. A material of the transparent contact layer 2 is a transparent hard material, such as glass, acrylic, etc., which is not specifically limited herein.

As shown in FIGS. 1 and 2, the light shielding layer 3 is located between the sensing layer 1 and the transparent contact layer 2, and the light shielding layer 3, the sensing layer 1 and the transparent contact layer 2 may be arranged in parallel. The light shielding layer 3 has multiple light transmission portions 31 through which the light can pass. Each light transmission portion 31 may adopt a through-hole structure or a transparent structure formed of a transparent material. The area between two adjacent light transmission portions 31 is a light shielding structure, that is, the area between two adjacent light transmission portions is light proof. The light reflected by the finger may pass through the light transmission portion 31 and irradiate the corresponding sensing layer 1 to form a fingerprint image, so that the photosensitive unit obtains information about the fingerprint.

Further, in order to improve the accuracy of recognition, ranges on the contact surface, where two adjacent light transmission portions 31 obtain light rays, at least partially overlap with each other, so that the sensing layer 1 can receive light rays reflected by each area of the object to be tested to avoid missing textures. Meanwhile, ranges on the sensing layer 1, irradiated by of light rays toward the sensing layer 1 and transmitted by two adjacent light transmission portions 31, are spaced apart from each other, that is, ranges on the surface of the sensing layer 1 close to the light source 4 where the light rays transmitted by two adjacent light transmission portions 31 irradiate do not overlap, so as to avoid the crosstalk of the texture information and ensure the accuracy of the texture recognition.

As shown in FIGS. 1 and 2, in the first embodiment of the present disclosure, the light shielding layer 3 is made from a light-proof material, and the light transmission portion 31 includes a through hole penetrating through the light shielding layer 3. With the principle of pin-hole imaging, an image of the textures of the object to be tested is formed on the sensing layer 1.

In order that the ranges on the contact surface, where two adjacent light transmission portions 31 obtain light rays, at least partially overlap with each other, and the ranges on the sensing layer 1, irradiated by the light rays transmitted by two adjacent light transmission portions 31, are spaced apart from each other, a center distance between two adjacent light transmission portions 31 satisfies the following conditions:

$$\sqrt{2}\, h_o \frac{d_h}{h_h} \geq r \geq 2 h_i \frac{d_h}{h_h} \qquad (1)$$

where r is the center distance between two adjacent light transmission portions 31, and $h_o$ is a distance between a center of the light transmission portion 31 and the contact surface in a direction perpendicular to the light shielding layer 3, $h_i$ is a distance between the center of the light transmission portion 31 and a surface of the sensing layer 1 close to the light shielding layer 3 in the direction perpendicular to the light shielding layer 3, $d_h$ is a diameter of the light transmission portion 31, $h_h$ is a length of the light portion 31 in the direction perpendicular to the light shielding layer 3.

The derivation process of the above formula (1) is explained below.

As shown in FIG. 1, the light transmission portion 31 is a through hole, and the maximum angle between light rays passing through the through hole is α; a depth of the through hole, that is, the thickness of the light shielding layer 3, is $h_h$; a diameter of the through hole is $d_h$; a diameter of a range on the contact surface, where any light transmission portion 31 obtains light rays, is $d_o$; a diameter of a range on the sensing layer 1, irradiated by the light rays transmitted by any light transmission portion 31, is $d_i$.

As shown in FIG. 1, according to a geometric relationship of triangles, it can get:

$$\tan\!\left(\frac{\alpha}{2}\right) = \frac{d_h}{h_h},$$

then $$d_i = 2h_i \tan\!\left(\frac{\alpha}{2}\right);\ d_o = 2h_o \tan\!\left(\frac{\alpha}{2}\right);$$

In order that the ranges on the sensing layer 1, irradiated by the light rays transmitted by two adjacent light transmission portions 31, are spaced apart from each other, the following should be satisfied:

$$r \geq d_i = 2h_i \tan\left(\frac{\alpha}{2}\right); \quad (2)$$

In order that the ranges on the contact surface, where two adjacent light transmission portions 31 obtain light rays, at least partially overlap with each other, the following should be satisfied:

$$d_o \geq \sqrt{2}r; \quad (3)$$

According to formula (2) and formula (3), the above formula (1) can be derived.

Figure 3:
FIG. 3 is a diagram illustrating a fingerprint image formed by a texture recognition device according to a first embodiment of the present disclosure.

FIG. 3 illustrates an image formed when the textures are fingerprints, $d_t$ is 20 μm, $h_t$ is 40 μm, r is 350 μm, $h_o$ is 0.6 mm, and $h_i$ is 0.3 mm. As shown in FIG. 3, The image may be a texture image generated based on the electrical signal of the sensing layer 1, or an image formed directly on the sensing layer 1 by the light rays passing through the light transmission portion 31.

Figure 4:
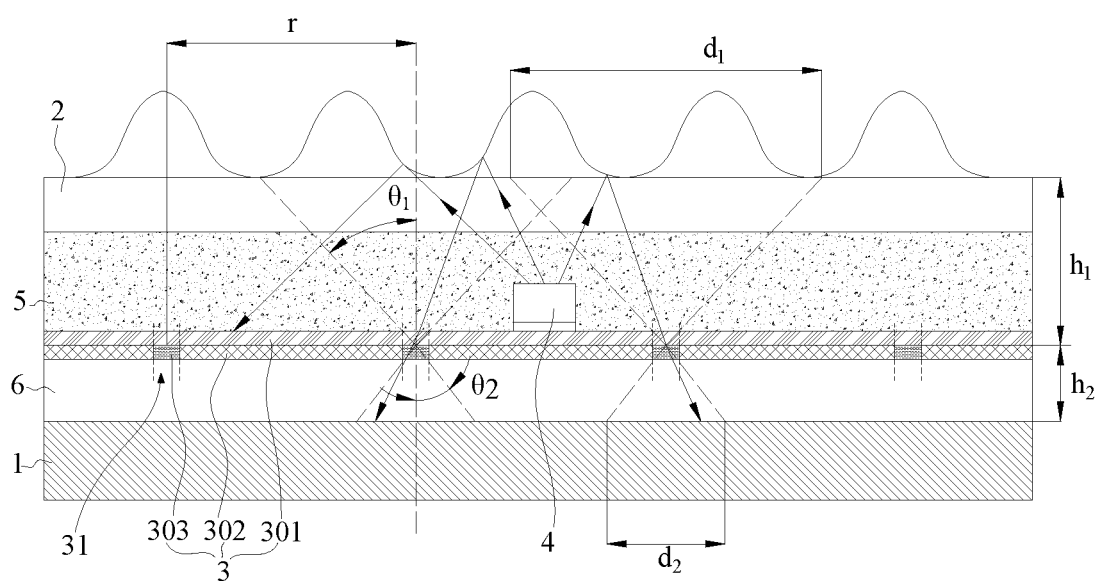
FIG. 4 is a partial cross-sectional view of a texture recognition device according to a second embodiment of the present disclosure.

In the second embodiment of the present disclosure, as shown in FIG. 4, the light shielding layer 3 includes a light transmission layer 301, a light-proof material layer 302, and a transparent filler 303.

The light transmission layer 301 is made from a transparent material. The light-proof material layer 302 is stacked on the surface of the light transmission layer 301 close to the sensing layer 1, and the light-proof material layer 302 is provided with a plurality of through holes.

The number of the transparent fillers 303 is the same as the number of the through holes, and the transparent fillers fill the through holes in one-to-one correspondence. The transparent portion 31 includes the transparent filler 303 and a portion of the light transmission layer 301 covered by the transparent filler 303.

The refractive index of the transparent filler 303 is less than the refractive index of the light transmission layer 301. According to a principle of total reflection, when the light rays reflected by the object to be tested irradiate the light transmission portion 31, the light rays whose incident angle meets the conditions of total reflection will be totally reflected without passing through the light transmission portion 31, thereby limiting the range of the sensing layer 1 where the light irradiates.

In order that the ranges on the sensing layer 1, irradiated by the light rays transmitted by two adjacent light transmission portions 31, are spaced apart from each other, and the ranges on the contact surface, where two adjacent light transmission portions 31 obtain light rays, at least partially overlap with each other, the following conditions should be satisfied:

$$\frac{\sqrt{6}\, n_1 h_2}{4n_2} \geq r \geq \frac{\sqrt{3}}{2} h_1; \quad (4)$$

where r is the center distance between two adjacent light transmission portions 31, and $h_1$ is a distance between a center of the light transmission portion 31 and the contact surface in a direction perpendicular to the light shielding layer 3, $h_2$ is a distance between the center of the light transmission portion 31 and a surface of the sensing layer 1 close to the light shielding layer 3 in the direction perpendicular to the light shielding layer 3, $n_1$ is a refractive index of the light transmission layer 301, and $n_2$ is a refractive index of the transparent filler 303, and $n_1 > n_2$.

The following describes the derivation process of the above formula (4).

As shown in FIG. 4, for the light ray reflected by the object to be tested, an incident angle relative to the light transmission portion 31 is $\theta_1$, and an exit angle is $\theta_2$. $d_1$ is the diameter of the range on the contact surface, where the light transmitting part 31 obtains light rays; $d_2$ is the diameter of the range on the sensing layer 1, irradiated by the light rays transmitted by the light transmitting part 31.

According to the law of refraction, a relationship among $\theta_1$, $\theta_2$, $n_1$ and $n_2$ satisfy the following: $n_1 \sin \theta_1 = n_2 \sin \theta_2$.

A relationship between $\theta_1$, $d_1$ and $h_1$ is: $\sin \theta_1 = d_1/h_1$ A relationship between $\theta_2$, $d_2$ and $h_2$ is: $\sin \theta_2 = d_2/h_2$ In order that the ranges on the sensing layer 1, irradiated by the light rays transmitted by two adjacent light transmission portions 31, are spaced apart from each other, the following should be satisfied:

$$r \geq d_1; \quad (5)$$

In order that the ranges on the contact surface, where two adjacent light transmission portions 31 obtain light rays, at least partially overlap, the following should be satisfied:

$$d_2 \geq \sqrt{2}r; \quad (6)$$

According to the relationship between $\theta_1$, $\theta_2$, $n_1$ and $n_2$, as well as formula (5) and formula (6), the following can be obtained:

$$\frac{\sqrt{2}\, n_1 h_2}{2n_2} \sin\theta_1 \geq r \geq h_1 \sin\theta_1; \quad (7)$$

A value range of $\theta_1$ can be defined as $60° \geq \theta_1 > 0°$, the above formula (4) can be obtained by introducing the value of $\theta_1$ into the formula (7).

Figure 5:
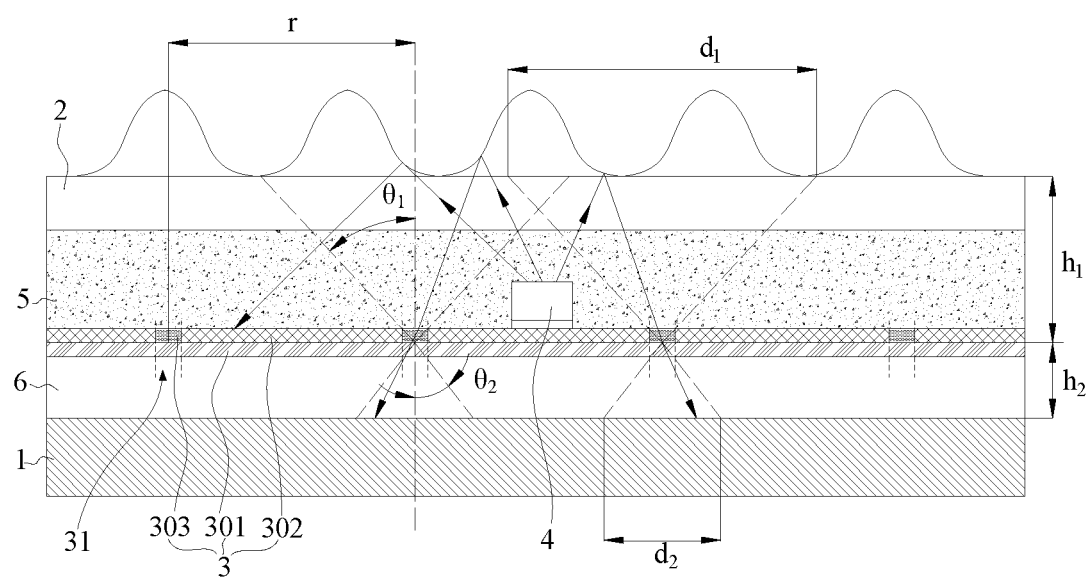
FIG. 5 is a partial cross-sectional view of a texture recognition device according to a third embodiment of the present disclosure.

In the third embodiment of the present disclosure, as shown in FIG. 5, the light shielding layer 3 includes a light transmission layer 301, a light-proof material layer 302, and a transparent filler 303.

The light transmission layer 301 is made from a transparent material. The light-proof material layer 302 is stacked on the surface of the light transmission layer 301 facing away from the sensing layer 1, and the light-proof material layer 302 is provided with a plurality of through holes.

The number of transparent fillers 303 is the same as the number of the through holes, and the transparent fillers fill the through holes in one-to-one correspondence. The transparent portion 31 includes the transparent filler 303 and a portion of the transparent layer 301 covered by the transparent filler 303.

The refractive index of the transparent filler 303 is greater than the refractive index of the light transmission layer 301. According to a principle of total reflection, when the light rays reflected by the object to be tested irradiate the light transmission portion 31, the light ray whose incident angle meets the conditions of total reflection will be totally reflected without passing through the light transmission portion 31, thereby limiting the range on the sensing layer 1 where the light rays irradiate.

In order that the ranges on the sensing layer 1, irradiated by the light rays transmitted by two adjacent light transmission portions 31, are spaced apart from each other, and the ranges on the contact surface, where two adjacent light transmission portions 31 obtain light rays, at least partially overlap with each other, the limiting conditions can refer to that described in the second embodiment, that is, the above formula (4) is also satisfied. The difference is that in this embodiment, $n_1$ is the refractive index of the transparent filler 303, $n_2$ is the refractive index of the light transmission layer 301, and $n_1 > n_2$, which will not be described in detail here.

In other embodiments of the present disclosure, the light shielding layer 3 is a film layer made from light-proof materials. The light shielding layer is provided with through holes that correspond to respective photosensitive units in one-to-one, and each through hole is filled with a filler. The filler includes a first light transmission layer and a second light transmission layer stacked. The first light transmission layer is located on the side of the second light transmission layer close to the sensing layer 1. The refractive index of the first light transmission layer is less than that of the second light transmission layer, the specific principle can refer to the second embodiment. Alternatively, the first light transmission layer is located on the side of the second light transmission layer facing away from the sensing layer 1, and the refractive index of the first light transmission layer is greater than that of the second light transmission layer, the specific principle can refer to the third embodiment.

As shown in FIGS. 1, 2, 4, and 5, there are multiple light sources 4, and the light sources 4 are distributed in an array on the side of the light shielding layer 3 close to the transparent contact layer 2, for example, distributed in an array on the surface of the light shielding layer 3 close to the transparent contact layer 2. Each light source 4 can emit light rays to irradiate the transparent contact layer 2, and when the object to be tested is attached to the transparent contact layer 2, the light rays irradiate the textures. The light source 4 may be a Mini light-emitting diode (LED), but it is not limited to this, and may also be a Micro LED or other light-emitting devices, which will not be listed here.

In addition, as shown in FIGS. 1, 4, and 5, the texture recognition device according to the embodiments of the present disclosure may further include a transparent flat layer 5 that covers the light sources 4 and the light shielding layer 3. The surface of the transparent flat layer 5 facing away from the light shielding layer 3 is flat, and the transparent contact layer 2 is located on the side of the transparent flat layer 5 facing away from the light shielding layer 3.

As shown in FIGS. 1, 4, and 5, the texture recognition device of the embodiments of the present disclosure may further include a filling layer 6. The filling layer 6 is made from a transparent material, and disposed between the light source 4 and the sensing layer 1 to support the light source 4.

An embodiment of the present disclosure further provides an electronic apparatus including the texture recognition device of any of the above embodiments. For example, the electronic apparatus may be a mobile phone, a tablet computer, an access control device, etc., as long as the texture recognition device can be used, which is not specifically limited herein. For the beneficial effects of the electronic apparatus, reference may be made to the beneficial effects of the above-mentioned texture recognition device, which will not be repeated here.

Other embodiments of the present disclosure will be apparent to those skilled in the art. The present application is intended to cover any variations, uses, adaptations of the present disclosure, which comply with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A texture recognition device, comprising:
a sensing layer comprising a plurality of photosensitive units;
a transparent contact layer disposed on a side of the sensing layer;
a light shielding layer disposed between the sensing layer and the transparent contact layer, wherein the light shielding layer comprises:
a plurality of light transmission portions;
a light transmission layer;
a light-proof material layer, wherein the light-proof material layer is stacked on a surface of the light transmission layer close to the sensing layer, and is provided with a plurality of through holes; and
a plurality of transparent fillers filled in the through holes in a one-to-one correspondence, wherein a refractive index of each of the transparent fillers is smaller than a refractive index of the light transmission layer, and the light transmission portions comprise the transparent fillers, and portions of the light transmission layer covered by the transparent fillers;
a plurality of light sources, wherein the plurality light sources is distributed on a side of the light shielding layer close to the transparent contact layer, and light emitted by the light sources is reflected by the transparent contact layer and transmitted to the photosensitive units by passing through the light transmission portions;
wherein ranges on a surface of the transparent contact layer facing away from the sensing layer, where two adjacent light transmission portions obtain light rays, at least partially overlap with each other; and ranges on the sensing layer, irradiated by the light rays transmitted by two adjacent light transmission portions, are spaced from each other
wherein a center distance r between two adjacent ones of the light transmission portions satisfies the following condition:

$$\frac{\sqrt{6}\, n_1 h_2}{4 n_2} \geq r \geq \frac{\sqrt{3}}{2} h_1$$

where h1 is a distance between a center of the light transmission portion and a surface of the transparent contact layer facing away from the sensing layer in a direction perpendicular to the light shielding layer, h2 is a distance between the center of the light transmission portion and a surface of the sensing layer close to the light shielding layer in the direction perpendicular to the light shielding layer, n1 is the refractive index of the light transmission layer, n2 is the refractive index of the transparent filler.

2. The texture recognition device according to claim 1, wherein the light sources comprise a Mini LED and a Micro LED.

3. The texture recognition device according to claim 1, wherein each of the light transmission portions comprise a through hole penetrating the light shielding layer.

4. The texture recognition device according to claim 1, further comprising: a transparent flat layer covering the light sources and the light shielding layer, wherein the transparent contact layer is located on a side of the transparent flat layer facing away from the light shielding layer.

5. A texture recognition device, comprising:
- a sensing layer comprising a plurality of photosensitive units;
- a transparent contact layer disposed on a side of the sensing layer;
- a light shielding layer disposed between the sensing layer and the transparent contact layer, wherein the light shielding layer comprises:
  - a plurality of light transmission portions;
  - a light transmission layer;
  - a light-proof material layer, wherein the light-proof material layer is stacked on a surface of the light transmission layer facing away from the sensing layer, and provided with a plurality of through holes; and
  - a plurality of transparent fillers filled in the through holes in a one-to-one correspondence, wherein a refractive index of each of the transparent fillers is greater than a refractive index of the light transmission layer, and the light transmission portions comprise the transparent fillers, and portions of the light transmission layer covered by the transparent fillers;
- a plurality of light sources, wherein the plurality light sources are distributed on a side of the light shielding layer close to the transparent contact layer, and light emitted by the light sources is reflected by the transparent contact layer and transmitted to the photosensitive units by passing through the light transmission portions;
- wherein ranges on a surface of the transparent contact layer facing away from the sensing layer, where two adjacent light transmission portions obtain light rays, at least partially overlap with each other; and ranges on the sensing layer, irradiated by the light rays transmitted by two adjacent light transmission portions, are spaced from each other;
- wherein a center distance r between two adjacent light transmission portions satisfies the following condition:

$$\frac{\sqrt{6}\, n_1 h_2}{4 n_2} \geq r \geq \frac{\sqrt{3}}{2} h_1$$

where $h_1$ is a distance between a center of the light transmission portion and a surface of the transparent contact layer facing away from the sensing layer in a direction perpendicular to the light shielding layer, $h_2$ is a distance between the center of the light transmission portion and a surface of the sensing layer close to the light shielding layer in the direction perpendicular to the light shielding layer, $n_1$ is the refractive index of the transparent filler, $n_2$ is the refractive index of the light transmission layer.

6. The texture recognition device according to claim 5, wherein the texture recognition device is implemented as a part of an electronic apparatus.

7. The electronic apparatus according to claim 6, wherein the light sources comprise a Mini LED and a Micro LED.

8. The electronic apparatus according to claim 6, wherein each of the light transmission portions comprise a through hole penetrating the light shielding layer.

9. The electronic apparatus according to claim 6, further comprising: a transparent flat layer covering the light sources and the light shielding layer, wherein the transparent contact layer is located on a side of the transparent flat layer facing away from the light shielding layer.

10. The texture recognition device according to claim 5, wherein the light sources comprise a Mini LED and a Micro LED.

11. The texture recognition device according to claim 5, wherein each of the light transmission portions comprise a through hole penetrating the light shielding layer.

12. The texture recognition device according to claim 5, further comprising: a transparent flat layer covering the light sources and the light shielding layer, wherein the transparent contact layer is located on a side of the transparent flat layer facing away from the light shielding layer.

13. An electronic apparatus comprising a texture recognition device, wherein the texture recognition device comprises:
- a sensing layer comprising a plurality of photosensitive units;
- a transparent contact layer disposed on a side of the sensing layer;
- a light shielding layer disposed between the sensing layer and the transparent contact layer, wherein the light shielding layer comprises:
  - a plurality of light transmission portions;
  - a light transmission layer;
  - a light-proof material layer, wherein the light-proof material layer is stacked on a surface of the light transmission layer close to the sensing layer, and provided with a plurality of through holes; and
  - a plurality of transparent fillers filled in the through holes in a one-to-one correspondence, wherein a refractive index of each of the transparent fillers is smaller than a refractive index of the light transmission layer, and the light transmission portions comprise the transparent fillers, and portions of the light transmission layer covered by the transparent fillers;
- a plurality of light sources, wherein the plurality light sources is distributed on a side of the light shielding layer close to the transparent contact layer, and light emitted by the light sources is reflected by the transparent contact layer and transmitted to the photosensitive units by passing through the light transmission portions;
- wherein ranges on a surface of the transparent contact layer facing away from the sensing layer, where two adjacent light transmission portions obtain light rays, at least partially overlap with each other; and ranges on the sensing layer, irradiated by the light rays transmitted by two adjacent light transmission portions, are spaced from each other
- wherein a center distance r between two adjacent light transmission portions satisfies the following condition:

$$\frac{\sqrt{6}\, n_1 h_2}{4 n_2} \geq r \geq \frac{\sqrt{3}}{2} h_1$$

where $h_1$ is a distance between a center of the light transmission portion and a surface of the transparent contact layer facing away from the sensing layer in a direction perpendicular to the light shielding layer, $h_2$ is a distance between the center of the light transmission portion and a surface of the sensing layer close to the light shielding layer in the direction perpendicular to the light shielding layer, $n_1$ is the refractive index of the light transmission layer, $n_2$ is the refractive index of the transparent filler.

14. The electronic apparatus according to claim 13, wherein the light sources comprise a Mini LED and a Micro LED.

15. The electronic apparatus according to claim 13, wherein each of the light transmission portions comprise a through hole penetrating the light shielding layer.

16. The electronic apparatus according to claim 13, wherein the texture recognition device further comprises: a transparent flat layer covering the light sources and the light shielding layer, and the transparent contact layer is located on a side of the transparent flat layer facing away from the light shielding layer.

* * * * *